United States Patent
Yoshida

(10) Patent No.: US 7,069,050 B2
(45) Date of Patent: Jun. 27, 2006

(54) ANTENNA TRANSMISSION AND RECEPTION SYSTEM

(75) Inventor: Shousei Yoshida, Tokyo (JP)

(73) Assignee: NEC Corporation, Tokyo (JP)

( * ) Notice: Subject to any disclaimer, the term of this patent is extended or adjusted under 35 U.S.C. 154(b) by 484 days.

(21) Appl. No.: 10/442,190

(22) Filed: May 21, 2003

(65) Prior Publication Data

US 2004/0009755 A1 Jan. 15, 2004

(30) Foreign Application Priority Data

May 21, 2002 (JP) .............................. 2002-146814

(51) Int. Cl.
*H04B 1/38* (2006.01)
*H04M 1/00* (2006.01)

(52) U.S. Cl. ............... 455/561.2; 455/101; 455/277.2; 455/561; 455/575.7; 455/272; 375/347; 375/267; 375/299; 370/334; 370/336

(58) Field of Classification Search ................ 455/101, 455/277.2, 561, 562.1, 575.7, 269, 272; 375/347, 375/267, 299; 370/334, 336
See application file for complete search history.

(56) References Cited

U.S. PATENT DOCUMENTS 5,903,238 A * 5/1999 Sokat et al. ................. 342/365
5,914,946 A * 6/1999 Avidor et al. ................ 370/336
5,940,769 A * 8/1999 Nakajima et al. ........... 455/509
5,966,670 A * 10/1999 Keskitalo et al. ......... 455/562.1
6,073,032 A * 6/2000 Keskitalo et al. ............ 455/561
6,091,788 A * 7/2000 Keskitalo et al. ............ 375/347
6,128,476 A * 10/2000 Fujita .......................... 455/101
6,144,652 A * 11/2000 Avidor et al. ................ 370/336
6,144,711 A 11/2000 Raleigh et al.

OTHER PUBLICATIONS

Huang, H., et al., "Achieving high data rates on the UMTS downlink shared channel using multiple antennas", 3G Mobile Communication Technologies, pp. 373-377 (Mar. 2001).

N. Ishii, et al., "Performance Comparison between Beamforming and MIMO in W-CDMA HSDPA" Proceedings of the 2002 IEICE General Conference, p. 561 (Mar. 2002).

English translation of Chinese Office Action dated Apr. 1, 2005.

* cited by examiner

Primary Examiner—Marceau Milord
(74) Attorney, Agent, or Firm—Whitham, Curtis, Christofferson & Cook P.C.

(57) ABSTRACT

A transmitter of a base station includes a data serial-to-parallel converter, M modulators, M beam formers, and transmission antennas. The data serial-to-parallel converter converts transmission data into M sequences. Each modulator modulates the transmission data. Each beam former weights the modulation signal to form directional beams. The transmission antennas narrow the beams and transmit the modulation signals in parallel (MIMO transmission). In a mobile station, a receiver has reception antennas for receiving data transmitted in parallel and an MIMO demodulator for demodulating the data.

14 Claims, 14 Drawing Sheets

(a) BASE-STATION TRANSMITTER    (b) MOBILE-STATION RECEIVER (a) BASE-STATION TRANSMITTER (b) MOBILE-STATION RECEIVER

QPSK SIGNAL

16QAM SIGNAL

ANTENNA TRANSMISSION AND RECEPTION SYSTEM

This application claims priority to prior application JP 2002-146814, the disclosure of which is incorporated herein by reference.

BACKGROUND OF THE INVENTION

The present invention relates to an antenna transmission and reception system in a mobile communication system, and in particular, relates to an antenna transmission and reception system in which a large amount of data can be transmitted with high efficiency in each cell.

In future mobile communication cellular systems, an increased traffic of high-rate packet data is expected, particularly, in down links. Accordingly, these systems require the immediate development of wireless transmission methods capable of transmitting a large amount of data with high efficiency. For this development, the following method is currently being studied. This method gives high priority to users in good transmission environments using multilevel modulation methods to realize high-speed data transmission. In addition, array antenna technology improves the signal to interference noise ratio (SINR) of a received signal using space domain multiple access. Therefore, the adoption of array antenna technology is also expected.

In mobile communication systems, the requirements for reduction in the size and weight of mobile stations (portable terminals) are strict. Therefore, directional-beam transmission control would be effective when used in mobile communication systems. According to this control, a plurality of antennas are arranged on a base station which can use comparatively complicated signal processing so as to narrow the antenna directivity toward a particular mobile station. The directional-beam transmission control allows amplification of a desired signal and does not cause interference with other mobile stations. Thereby, high-quality communication can be realized and the available range of cells can be increased. On the other hand, since a few (two to four) antennas can be provided for each mobile station, the characteristics of the mobile communication system using spatial diversity reception can be effectively improved.

Now, description will be made of an example of an arrangement of a related antenna transmission and reception system with reference to FIG. 1.

In the related antenna transmission and reception system, each base station includes a transmitter having N (N is an integer of 2 or more) antennas and each mobile station includes a receiver having M (M is an integer of 2 or more) antennas. The base station performs directional-beam transmission while the mobile station performs diversity reception. The number of antennas N of the base station can be larger than the number of antennas M of the mobile station. Generally, N is set to 6 to 8 while and M is set to 2.

In FIG. 1, a transmitter of the base station (a) comprises an encoder 101, a modulator 102, a beam former 103, and transmission antennas 104-1 to 104-N. The encoder 101 receives a data signal and performs error correction coding. The modulator 102 divides an encoded bit string into segments each having a predetermined length and maps the segments to respective modulation symbols.

Referring to FIGS. 2A and 2B, description will be made of examples of a digitally modulated signal serving as an output of the modulator 102. FIG. 2A shows a quadrature phase shift keying (QPSK) signal in which each modulation symbol comprises encoded data consisting of two bits. FIG. 2B shows a 16 quadrature amplitude modulation (16QAM) signal in which each modulation symbol comprises encoded data consisting of four bits. Generally, the respective bits are mapped so as to reduce the bit error rate even when modulation symbols are mistaken for the adjacent modulation symbols (Gray code mapping).

Referring to FIG. 3, the beam former 103 assigns weights to the digitally modulated signal to thereby form directional beams. Herein, it is to be noted that the weights are complex. The output of the modulator 102 is divided into N signals. N denotes the number of transmission antennas. Multipliers 111-1 to 111-N multiply the respective signals by antenna weights. The transmission antennas 104-1 to 104-N transmit the respective antenna-weighted signals. Methods of calculating the antenna weights include a method based on estimation of the arrival angles of multipaths and a method utilizing adaptive algorithm control.

FIG. 4 shows an example of the geometrical arrangement of the transmission antennas. The interval between each of the N transmission antennas serving as an antenna array is set to be narrow in order to exhibit directivity. Usually, a wavelength interval of 0.5 is selected.

Turning back to FIG. 1, the receiver (b) comprises reception antennas 105-1 to 105-M, a diversity demodulator 106, and a decoder 107. The reception antennas 105-1 to 105-M receive transmission signals which independently experience fading in respective transmission paths (also referred to as channels). The mobile station generally receives scattered waves from all directions. Although interval between the reception antennas 105-1 to 105-M is narrower than that between the antennas of the base station, each reception antenna can receive an independently faded signal.

Referring to FIG. 5, the diversity demodulator 106 combines the signals received by the respective antennas at the maximum ratio and demodulates respective bits. Therefore, each of channel estimation units 121-1 to 121-M estimates the amplitude and phase of the received signal of the corresponding antenna. Complex conjugate operation units 122-1 to 122-M each calculate the complex conjugate of the corresponding channel estimation. Multipliers 123-1 to 123-M each multiply the corresponding received signal by the complex conjugate of the corresponding channel estimation, demodulate the phase of the received signal, and weight the amplitude of the signal in order to combine the received signals at the maximum ratio.

A combiner 124 adds the weighted antenna signals. A soft decision unit 125 performs soft-decision modulation of the respective bits in the phase-corrected modulation symbols. In the case of a QPSK signal, the component of the I axis (real axis) and that of the Q axis (imaginary axis) of a complex signal serving as an output of the combiner 124 can be used as soft-decision demodulation signals of first and second bits, respectively. In the case of an 8PSK or 8QAM signal, another means is required in order to obtain a soft-decision demodulation signal. Therefore, maximum likelihood estimation is generally used.

A demodulation bit is represented by $\hat{b}_i$. The likelihood function of the demodulation bit is represented by $\Lambda(\hat{b}_i)$.

The likelihood function thereof is represented by:

$$\Lambda(\hat{b}_i) = \min_{x|b_i=0} \left| A_p r - x \sum_{j=1}^{M} |h_j|^2 \right|^2 - \min_{x|b_i=1} \left| A_p r - x \sum_{j=1}^{M} |h_j|^2 \right|^2 \quad (1)$$

where, $A_p$ denotes the level of a pilot signal which is used for channel estimation, r denotes an output of the combiner 124, x denotes the modulation symbol of a modulation signal, and $h_j$ denotes a channel estimation of the antenna received signal. The channel estimation is used to adjust the levels of $A_p r$ and x.

The soft-decision modulation operation shown by the above expression (1) will now be described in brief with reference to FIG. 6. Herein, FIG. 6 shows a 16QAM signal. The demodulation of a first bit will now be described. First, it is assumed that a bit 0 is transmitted. The square of the distance between each modulation symbol and r is calculated. Then, the minimum value of the squares is obtained. In FIG. 6, the symbol indicating 0001 has the minimum value. Subsequently, it is assumed that a bit 1 is transmitted. The square of the distance between each modulation symbol and r is calculated. Then, the minimum value of the squares is obtained. In FIG. 6, the symbol indicating 1001 has the minimum value. The difference between the minimum values serves as a soft-decision demodulation signal of the first bit. In the case shown in FIG. 6, the difference indicates a negative value, thus resulting in modulation of the bit having a value of approximately zero (zero in hard decision).

Second to fourth bits are sequentially subjected to similar soft-decision demodulation. Thus, soft-decision demodulation signals of the second to fourth bits can be obtained. The decoder 107 performs error correction decoding using the soft-decision demodulation signals of the respective bits obtained by the above maximum likelihood estimation. Convolution coding/Viterbi decoding and turbo coding/decoding are often used as error correction methods.

The related antenna transmission and reception system illustrated in FIG. 1 exhibits excellent performance in a large cell system including base stations having high antennas. Herein, it is noted that the high antennas mean that the height of each antenna is high. On the contrary, low antennas mean that the height of each antenna is low. In the large cell system, since the distance between each base station and each mobile station is large, the difference between the arrival angles of multipaths is small. Beams are narrowed using the directional-beam transmission control, thus obtaining a large gain.

Referring to FIG. 7, description will be made of the beam-gain characteristics change depending on the number of antennas. In a case where the arrival angles of transmission paths are concentrated in the direction A (0°), the number of antennas is increased to narrow the beams. As a consequence, the peak gain is increased. The peak gain in transmission with six antennas (hereinbelow, refer to as 6-antenna transmission) is higher that in transmission with three antennas (hereinbelow, refer to as 3-antenna transmission) by 3 dB. However, in a small-to-medium-sized cell system including base stations having low antennas, each base station is close to each mobile station. Therefore, the difference between the arrival angles of the paths is increased.

For example, it is assumed that the arrival paths are not only in the direction A (0°) but also in the directions B and C (±15°). In the case of the 6-antenna transmission, the gain in each of the directions B and C is decreased by about 10 dB. Accordingly, it is substantially impossible to transmit enough power to mobile stations through these paths. Therefore, the total transmission efficiency is reduced to about 40%. On the other hand, in the case of the 3-antenna transmission, although the gain in the direction A is reduced by 3 dB, the reduction in the beam gain in each of the directions B and C is small. The total transmission efficiency thereof is substantially 40%, or the same as the 6-antenna transmission case.

As described above, in the cell propagation environment having a large difference between the path arrival angles, even when the number of antennas is increased to narrow the directional beams to be transmitted, the transmission efficiency cannot be increased. On the other hand, when the mobile station is close to the base station, the signal correlation between antennas is decreased. Thus, it is difficult to form beams. Disadvantageously, the beam gain is also reduced.

According to MIMO (Multiple Input Multiple Output), a plurality of transmission antennas transmit different data in parallel and a plurality of reception antennas receive the data, respectively, thus realizing a high bit rate. This technique has been proposed and examined by H. Huang, M. Sandell, and H. Viswanathan, "Achieving high data rate on the UMTS downlink shared channel using multiple antennas", pp. 372–377, 3G Mobile Communication Technologies, 26–28 Mar. 2001; and Ishii, Yoshida, and Atokawa, "Performance Comparison between Beamforming and MIMO in W-CDMA HSPDA", B-5-111, Proceedings of the 2002 IEICE General Conference.

SUMMARY OF THE INVENTION

It is therefore an object of the present invention to provide an antenna transmission and reception system which is capable of increasing the efficiency of transmission of a small-to-medium-sized cell system including base stations having low antennas.

According to the present invention, in each base station having a plurality of antennas, the antennas are divided into a plurality of array antenna groups in accordance with a cell propagation environment. Each array antenna group performs loose directional-beam control. The array antenna groups transmit different data in parallel utilizing the above-mentioned MIMO (Multiple Input Multiple Output) technique (MIMO transmission). Consequently, the total characteristics of the system can be increased.

According to the present invention, there is provided an antenna transmission and reception system including: at least one base station having a plurality of antennas, the antennas being divided into a plurality of array antenna groups in accordance with a cell propagation environment, each array antenna group performing loose directional-beam control, the array antenna groups transmitting different data in parallel (MIMO transmission); and at least one mobile station having a plurality of antennas to receive the data transmitted in parallel (MIMO reception).

In the system according to the present invention, preferably, the interval between each of the antennas of the base station is determined so that the correlation between the antennas of each array antenna group is set to be as high as possible and the correlation between the array antenna groups is set to be as low as possible, and the interval between each of the antennas of the mobile station is determined so that the correlation between the antennas is set to be as low as possible.

In the system according to the present invention, preferably, at least one of the number of array antenna groups and the width of each directional beam of each array antenna group is determined in accordance with the difference between the arrival angles of multipaths in the base station or the antenna correlation value.

In the system according to the present invention, preferably, at least one of the number of array antenna groups and the width of each directional beam of each array antenna group is determined in accordance with the radius of a cell where the base station is arranged or the height of each antenna of the base station.

According to the present invention, there is provided an antenna transmission and reception system including: a first base station group including first base stations each having a plurality of antennas, which constitute an array antenna, to perform desired directional-beam control; a second base station group including second base stations each having a plurality of antennas, the antennas being divided into a plurality of array antenna groups in accordance with a cell propagation environment, each array antenna group performing loose directional-beam control, the array antenna groups transmitting different data in parallel (MIMO transmission); at least one mobile station which has a plurality of antennas, performs diversity reception upon communicating with the first base station group, and receives the data transmitted in parallel (MIMO reception) upon communicating with the second base station group.

In the system according to the present invention, the interval between each of the antennas of each first base station may be determined so that the correlation between the antennas is set to be as high as possible, the interval between each of the antennas of each second base station may be determined so that the correlation between the antennas of each array antenna group is set to be as high as possible and the correlation between the array antenna groups is set to be as low as possible, and the interval between each of the antennas of the mobile station may be determined so that the correlation between the antennas is set as low as possible.

In the system according to the present invention, preferably, at least one of selection between the first base station group and the second base station group, the number of array antenna groups in each second base station, and the width of each directional beam of each array antenna group is determined in accordance with the difference between the arrival angles of multipaths in the base station or the antenna correlation value.

In the system according to the present invention, preferably, at least one of selection between the first base station group and the second base station group, the number of array antenna groups in each second base station, and the width of each directional beam of each array antenna group is determined in accordance with the height of each antenna of each base station or the radius of a cell where the base station is arranged.

In the system according to the present invention, preferably, the mobile station includes software having a diversity reception function and software having an MIMO reception function and switches between the software in accordance with an antenna transmission system of the base station to accomplish diversity reception or reception of data transmitted in parallel (MIMO reception).

According to the present invention, there is provided an antenna transmission and reception system including: at least one base station having a transmitter including a data serial-to-parallel converter for converting transmission data into M sequences, M modulators for modulating the M sequences of the transmission data, respectively, M beam formers for weighting respective modulation signals to form directional beams, and transmission antennas for narrowing the beams to transmit the modulation signals in parallel (MIMO transmission); and at least one mobile station having a receiver including reception antennas for receiving data transmitted in parallel and an MIMO demodulator for demodulating the transmission data.

According to the present invention, there is provided an antenna transmission and reception system including: a first base station group including first base stations each having a transmitter including a modulator for modulating transmission data, a beam former for weighting a modulation signal to form directional beams, and transmission antennas for narrowing the beams to transmit the modulation signal; a second base station group including second base stations each having a transmitter including a data serial-to-parallel converter for converting transmission data into M sequences, M modulators for modulating the M sequences of the transmission data, respectively, M beam formers for weighting respective modulation signals to form directional beams, and transmission antennas for narrowing beams to transmit the modulation signals in parallel (MIMO transmission); and at least one mobile station having a receiver including reception antennas for receiving transmission data, a diversity demodulator for performing diversity demodulation to transmission data in order to communicate with the first base station group, and an MIMO demodulator for demodulating data transmitted in parallel in order to communicate with the second base station group.

In the system according to the present invention, preferably, the receiver of the mobile station has software having a diversity demodulation function and software having an MIMO demodulation function, and further includes a demodulation-mode switching unit for switching between the software in accordance with an antenna transmission system of the base station to realize diversity demodulation or MIMO demodulation.

According to the present invention, antennas of each base station is divided into a plurality of array antenna groups in accordance with a cell propagation environment. Each array antenna group performs loose directional-beam control. The array antenna groups transmit different data in parallel (MIMO transmission). Accordingly, a large amount of data can be transmitted with higher efficiency, thus improving the characteristics of the system.

Furthermore, according to the present invention, in a system including base stations performing directional-beam transmission and base stations performing MIMO transmission in accordance with cell propagation environments, each mobile station switches between software having a diversity demodulation function and software having an MIMO demodulation function in one terminal, thus communicating with each of the base stations of different antenna transmission systems. Consequently, the transmission and reception system capable of being flexibly adapted to the cell propagation environments can be realized.

DESCRIPTION OF THE PREFERRED EMBODIMENTS

Figure 8:
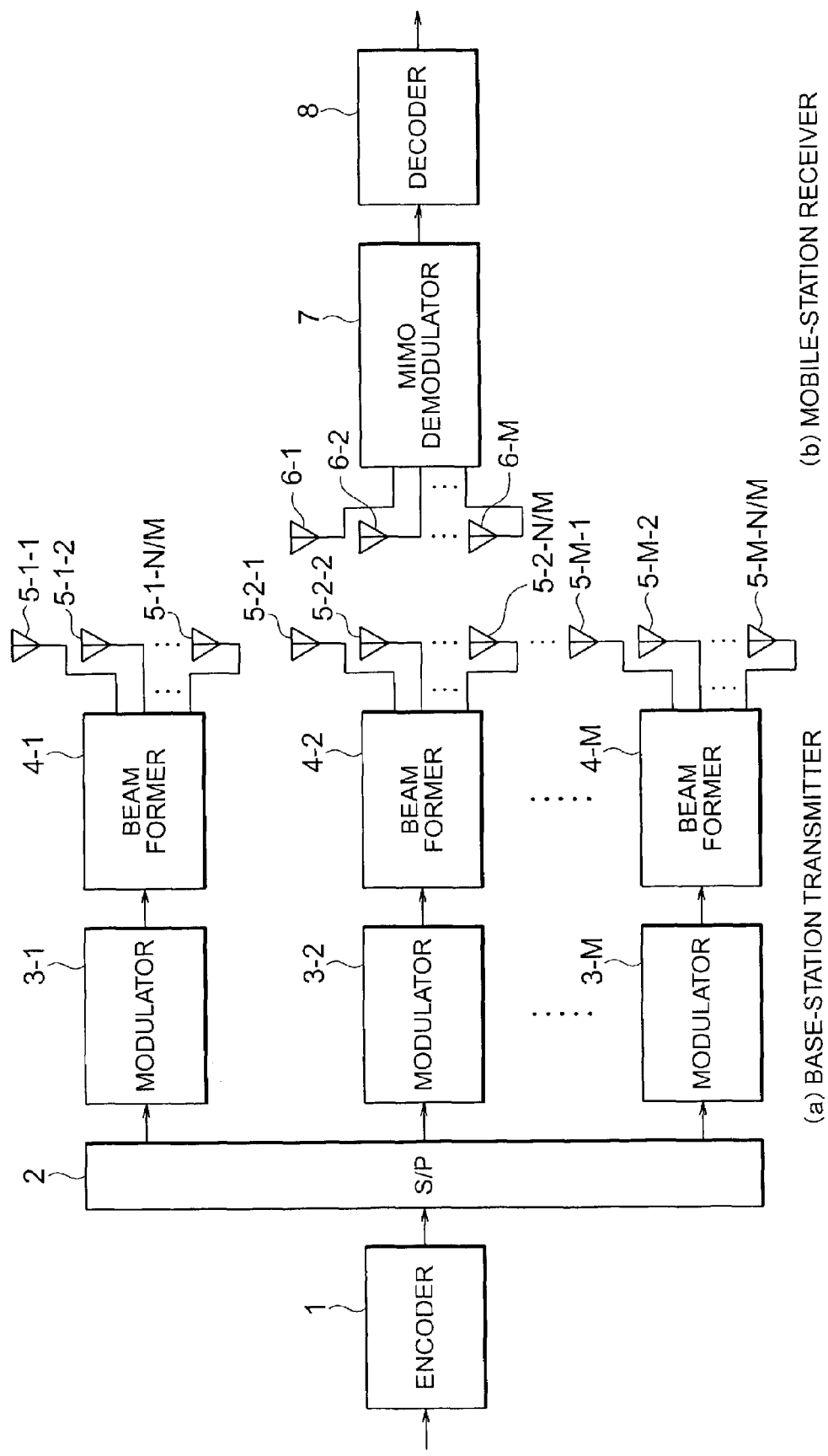
FIG. 8 shows the arrangement of an antenna transmission and reception system according to a first embodiment of the present invention.

Referring to FIG. 8, description will be made of the arrangement of an antenna transmission and reception system according to a first embodiment of the present invention.

In the antenna transmission and reception system according to the present embodiment, each base station has a transmitter including N antennas (N is an integer of 2 or more) while each mobile station has a receiver including M antennas (M is an integer of 2 or more). The number of antennas N of the base station can be set to be larger than the number of antennas M of the mobile station. Generally, N is set to 6 to 8 and M is set to 2 to 4.

In each base station, the antennas are divided into a plurality of array antenna groups in accordance with the transmission environment of a cell. Each array antenna group performs loose directional-beam control. The respective array antenna groups transmit data in parallel (MIMO (Multiple Input Multiple Output) transmission). Reception according to MIMO is performed on the reception side. According to MIMO transmission and reception, the transmitter can transmit an amount of data that is M times as much as that of conventional one-sequence data transmission, where M denotes the number of array antenna groups. Accordingly, under the same transmission-rate conditions, the order (the number of multilevel symbols) of modulation to be used can be reduced. In addition, as the order of modulation is lower, the required energy per bit to noise density ratio (Eb/No) becomes smaller. Thus, as compared to the one-sequence transmission, improved characteristics can be obtained.

At least one of the number of array antenna groups of the base station and the width of each directional beam of each array antenna group is determined in accordance with the difference between multipath-arrival angles in the base station or an antenna correlation value. In a case where the difference between multipath-arrival angles is large, or alternatively, in a case where the antenna correlation is small, even if the beams are narrowed, amplification is not obtained. Therefore, the number of array antenna groups is increased to extend the width of each beam of each array antenna group. Data is transmitted in parallel (MIMO transmission). Thus, amplification according to MIMO can be obtained. The difference between multipath-arrival angles and the antenna correlation depends on the radius of a cell or the antenna height of the base station. Therefore, at least one of the number of array antenna groups and the width of each directional beam of each array antenna group can also be determined in accordance with the radius of the cell or the antenna height.

Referring to FIG. 8, the transmitter (a) comprises an encoder 1, a data serial-to-parallel converter 2, modulators 3-1 to 3-M, beam formers 4-1 to 4-M, and transmission antennas 5-1-1 to 5-M-N/M. The encoder 1 receives a data signal and performs error correction coding. The data serial-to-parallel converter 2 sequentially divides encoded data comprising one sequence into M sequences. Each of the modulators 3-1 to 3-M divides bits of the corresponding sequence into segments each having a predetermined length and then maps the respective segments to modulation symbols.

Figure 1:
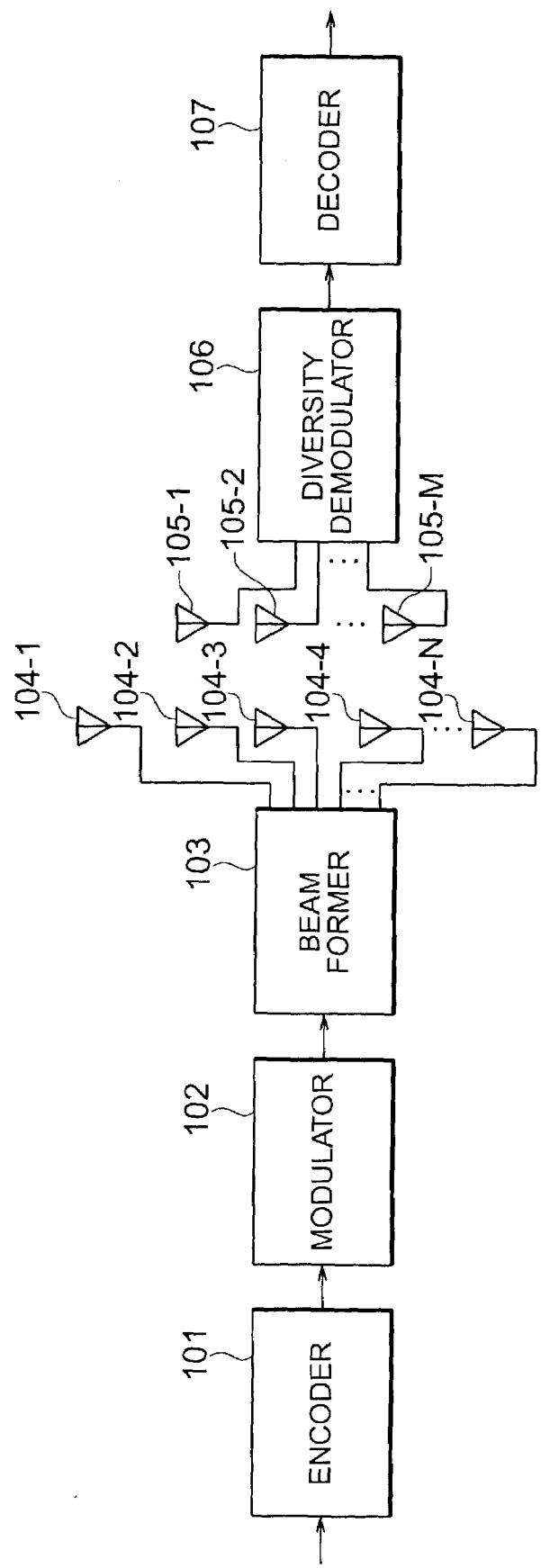
FIG. 1 shows the arrangement of a related antenna transmission and reception system.
Figure 2A:
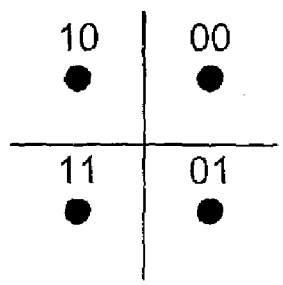
FIGS. 2A and 2B show examples of modulation symbols of a multilevel modulation signal.
Figure 2B:
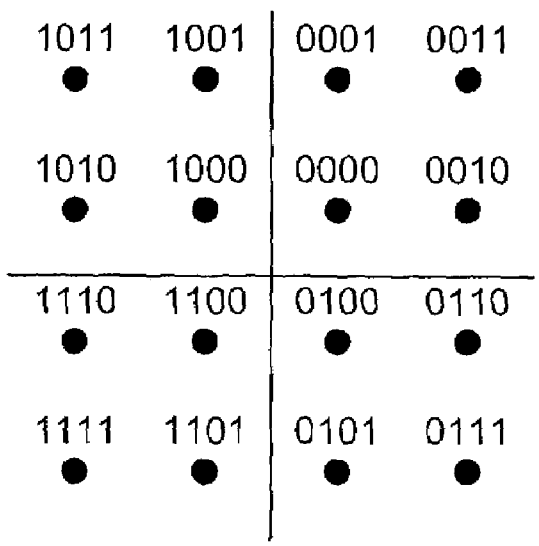
Figure 3:
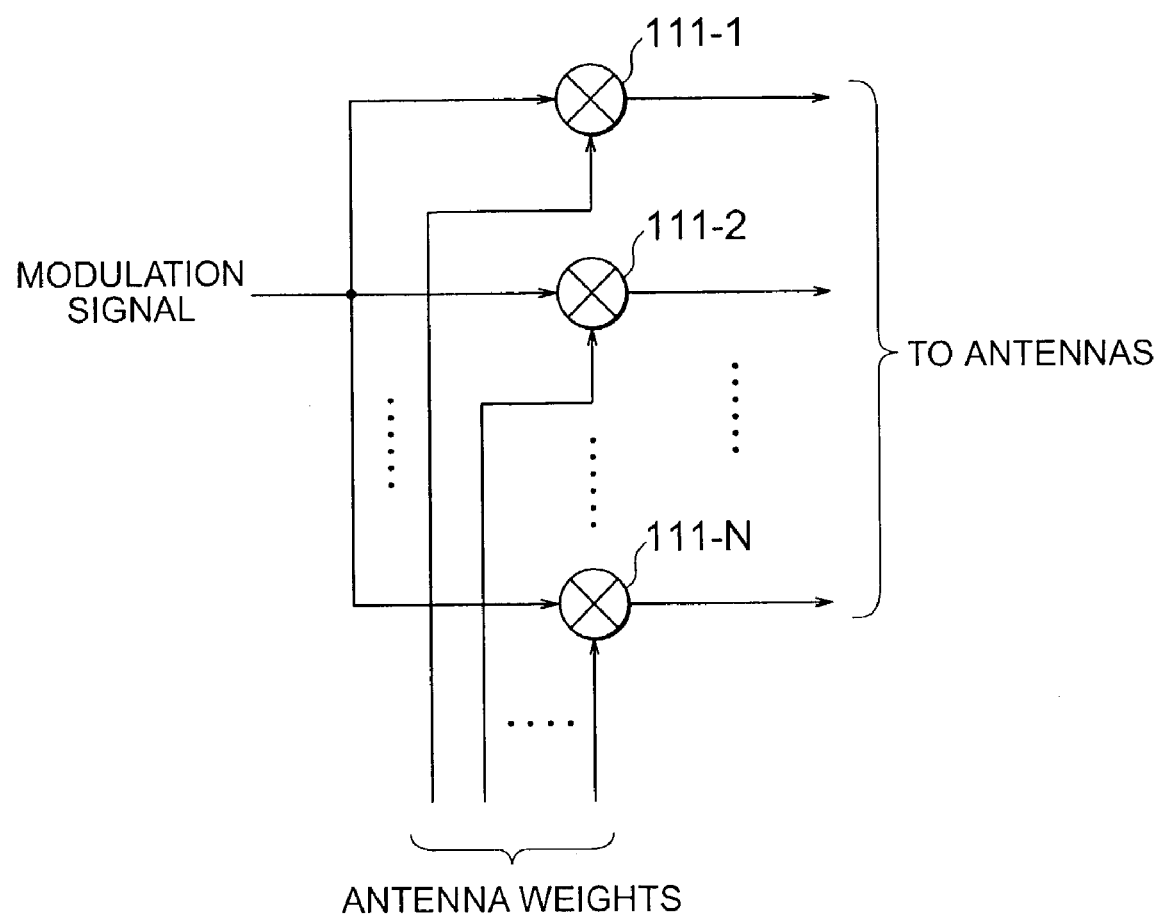
FIG. 3 is a block diagram showing the structure of a beam former included in the related system.
Figure 4:
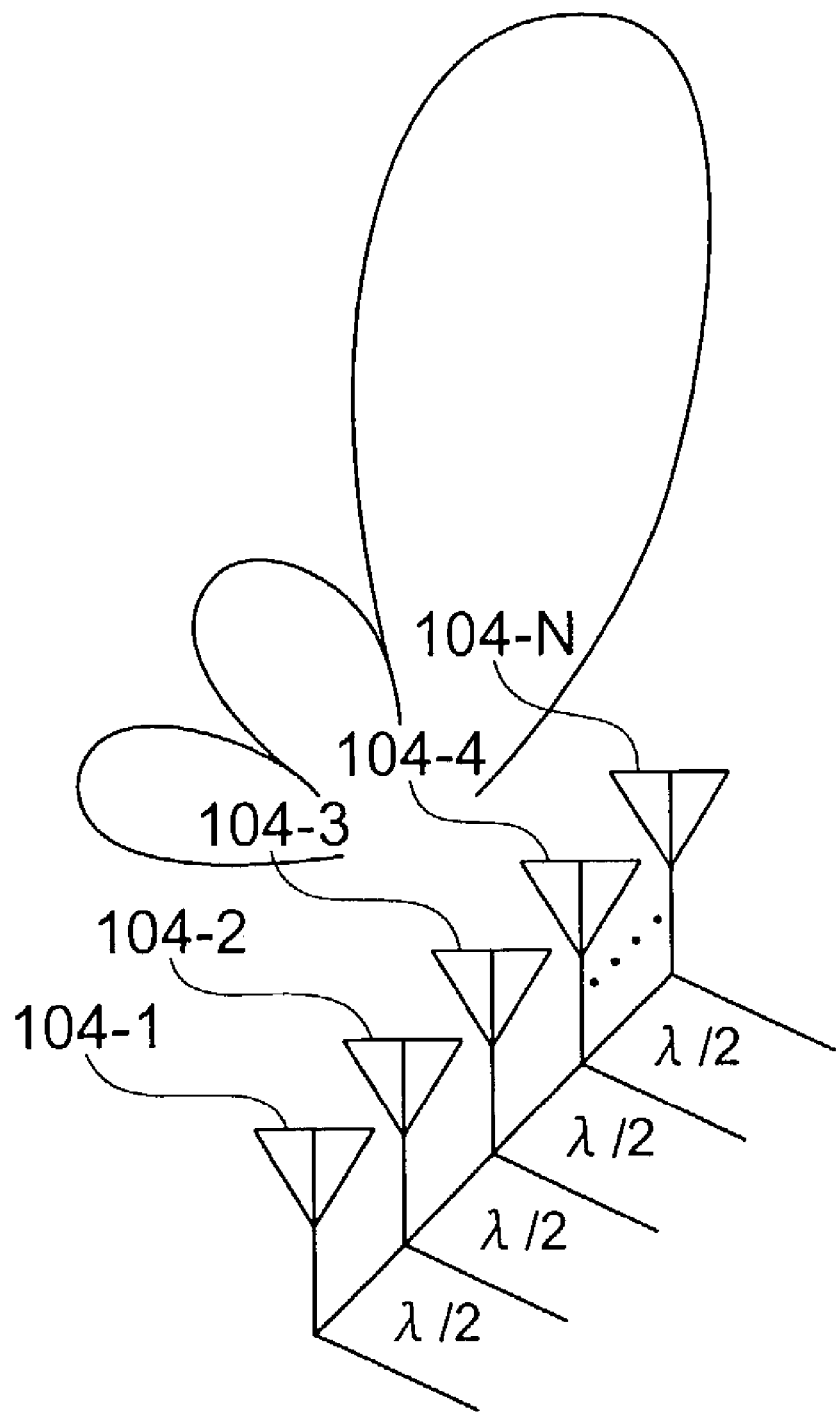
FIG. 4 is a diagram of a linear array antenna of the related conventional system.
Figure 5:
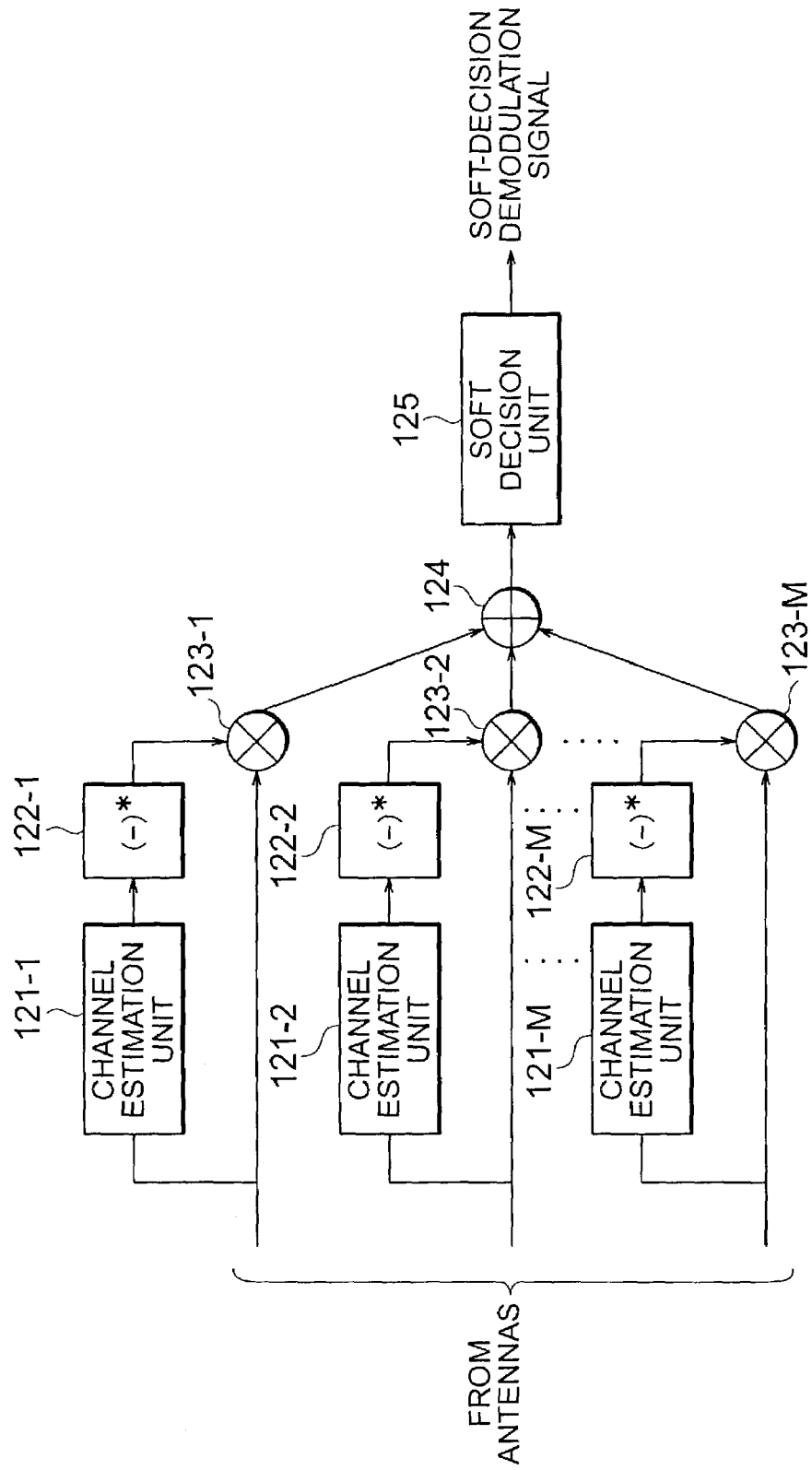
FIG. 5 is a diagram of the structure of a diversity demodulator included in the related system.
Figure 6:
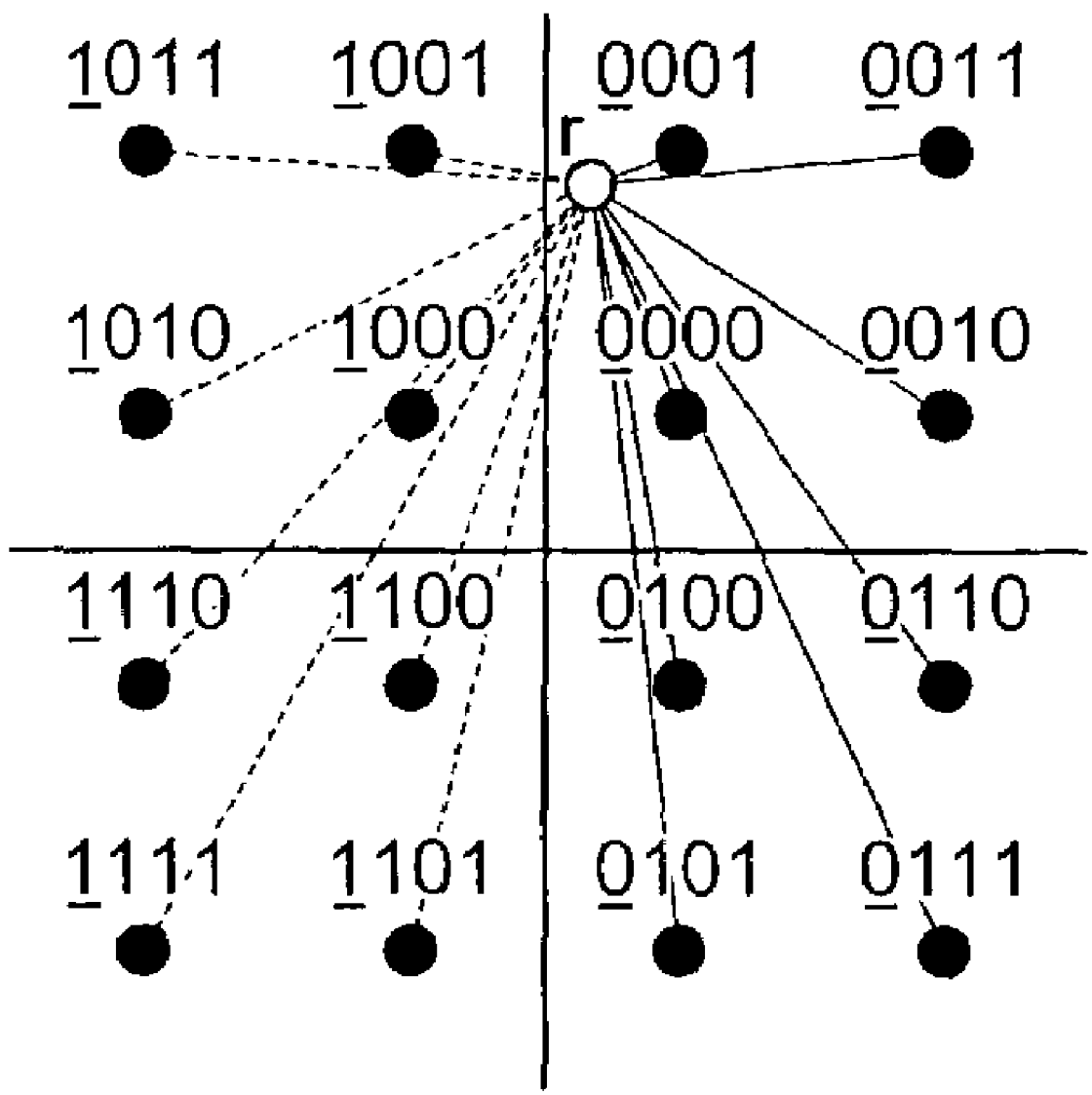
FIG. 6 is a diagram showing the operation of a soft decision unit.
Figure 7:
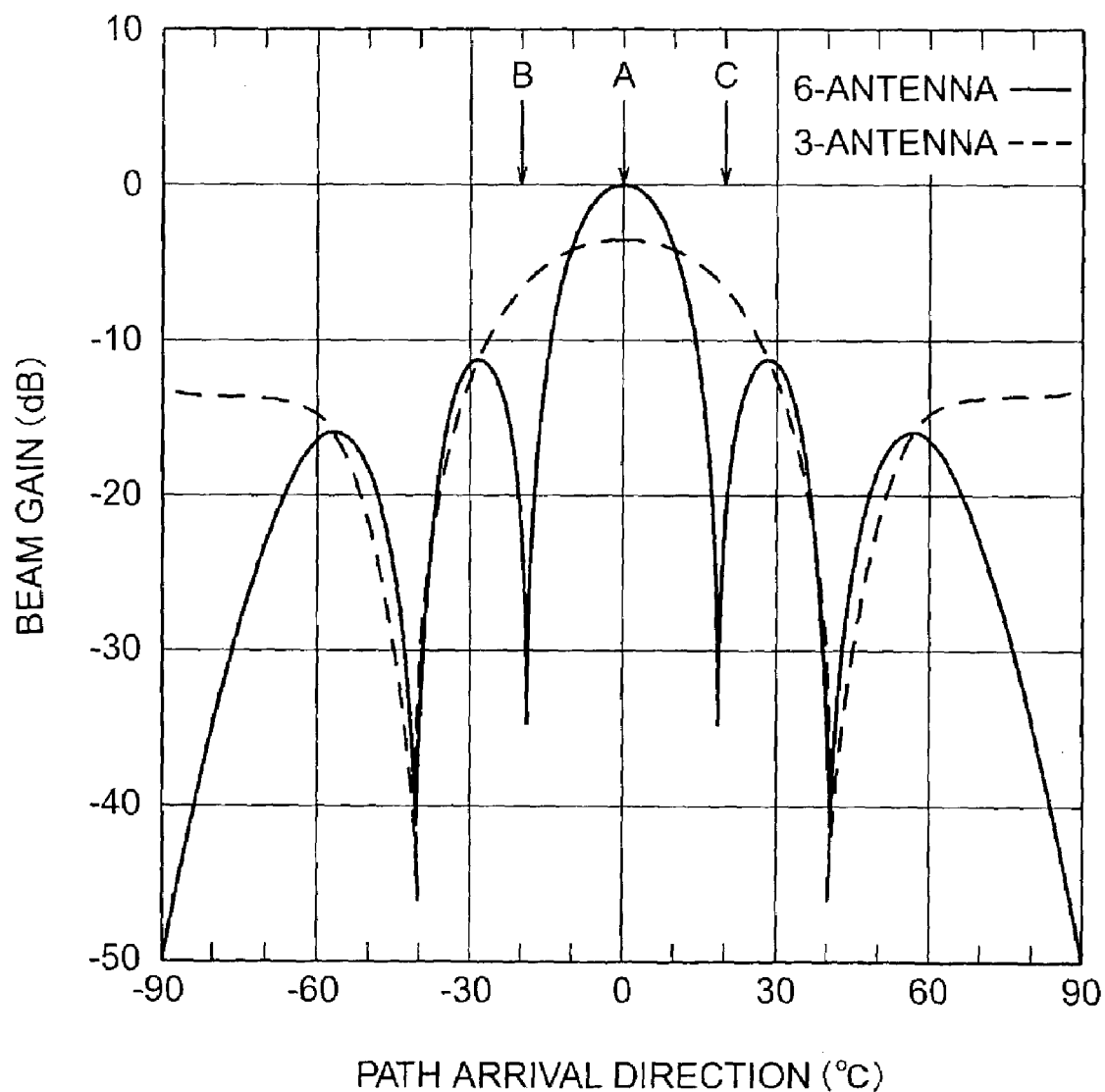
FIG. 7 is a graph showing beam gains in directional-beam transmission control.

For digitally modulated signals serving as outputs of the modulators 3-1 to 3-M, for example, in the case of using a quadrature phase shift keying (QPSK) signal in FIG. 2A, each modulation symbol comprises encoded data consisting of two bits. In the case of using a 16 quadrature amplitude modulation (16QAM) signal shown in FIG. 2B, each modulation symbol comprises encoded data consisting of four bits. Generally, the respective bits are mapped so as to reduce the bit error rate even when modulation symbols are mistaken for the adjacent modulation symbols (Gray code mapping).

The beam formers 4-1 to 4-M receive the M digitally modulated signals serving as the outputs of the modulators 3-1 to 3-M, respectively. Each beam former distributes the received digitally modulated signal into N/M signals and then assigns weights to the respective distributed signals to thereby form directional beams. It is noted here that the weights are complex.

Figure 9:
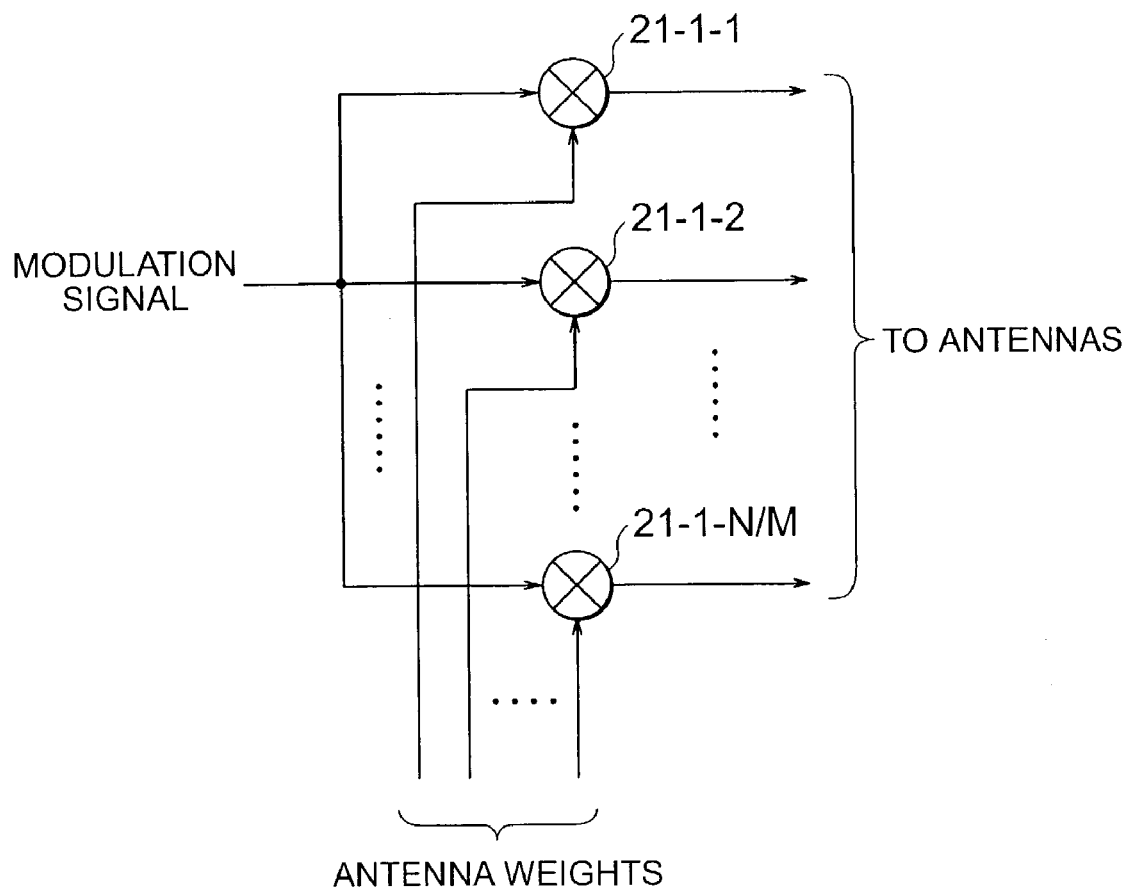
FIG. 9 is a block diagram of the structure of each beam former according to the first embodiment.

Referring to FIG. 9, the beam former 4-1 divides the output of the modulator 3-1 into N/M signals. N/M corresponds to the number of transmission antennas of each array antenna group. Multipliers 21-1-1 to 21-1-N/M multiply the respective signals by antenna weights. In the array antenna group, the N/M transmission antennas 5-1-1 to 5-M-N/M transmit the antenna-weighted signals, respectively. As antenna-weighting calculation methods, a method based on the estimation of the arrival angles of multipaths and a method using adaptive algorithm control are well-known. These methods can be applied to the present embodiment.

Figure 10:
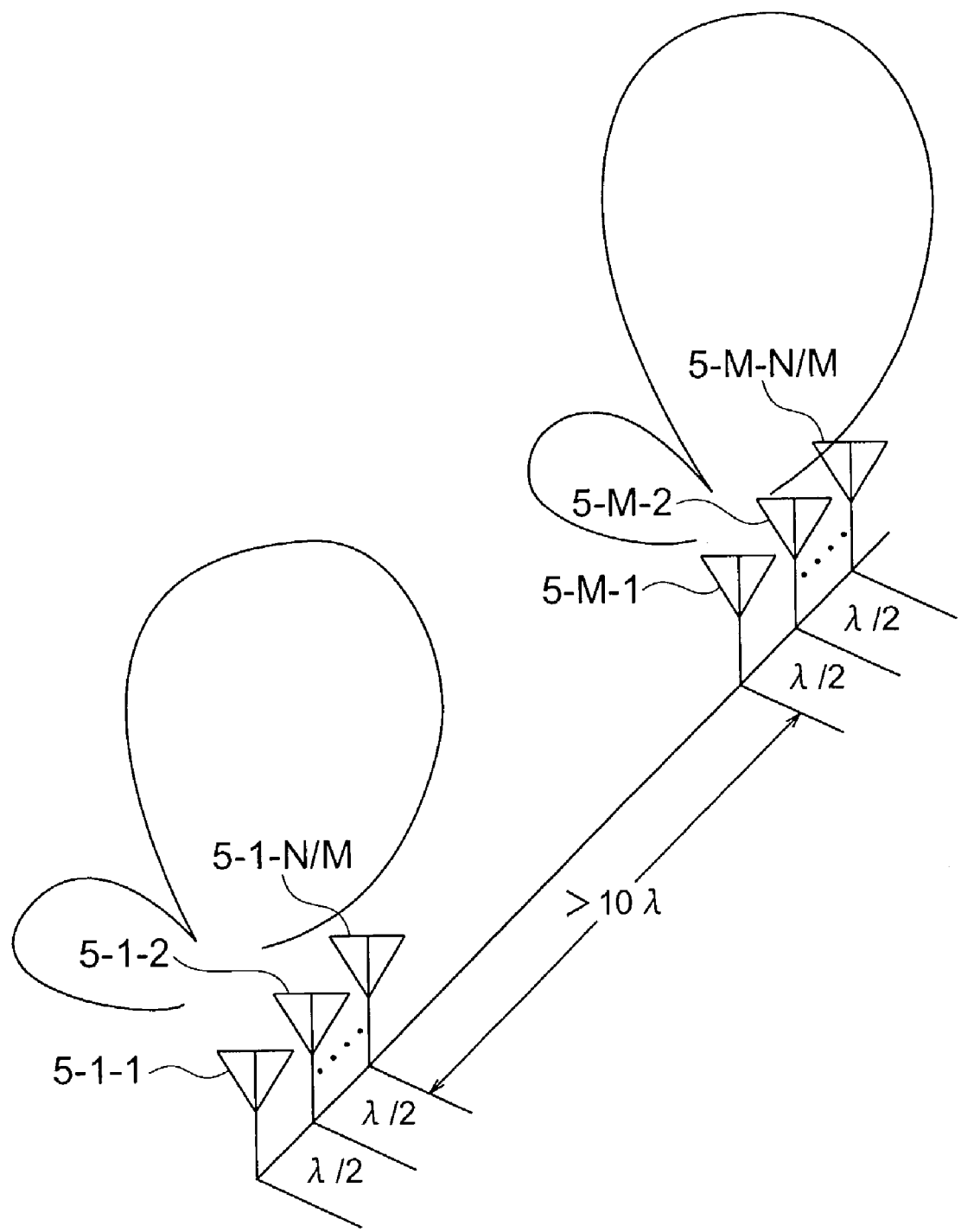
FIG. 10 shows an example of transmission antenna array groups according to the first embodiment and directional patterns thereof.

Referring to FIG. 10, description will be made of an example of the geometrical arrangement of the transmission antennas according to the present embodiment. The N antennas are divided into the M array antenna groups. The interval between each array antenna group is set to be wide so that independent fading occurs. Generally, an interval of 10 wavelengths or larger is selected. The interval between each of the N/M transmission antennas of each array antenna group is set to be narrow so that the directivity can be exhibited. Generally, a 0.5-wavelength interval is selected. FIG. 10 shows a case where the transmission antennas are divided into two array antenna groups (M=2). In order to arrange two array antenna groups with low correlation, dual-polarization arrays may be used.

Turning back to FIG. 8, a receiver of the mobile station comprises M reception antennas 6-1 to 6-M, an MIMO demodulator 7, and a decoder 8. The reception antennas 6-1 to 6-M receive signals transmitted in parallel. The signals have independently experienced fading in the transmission paths. The mobile station generally receives scattered waves from all directions. Accordingly, although the interval between each reception antenna is narrower than that of the base station, each of the reception antennas 6-1 to 6-M can experience independent fading. In order to arrange two branches with low correlation, dual-polarization antennas may be used.

Figure 11:
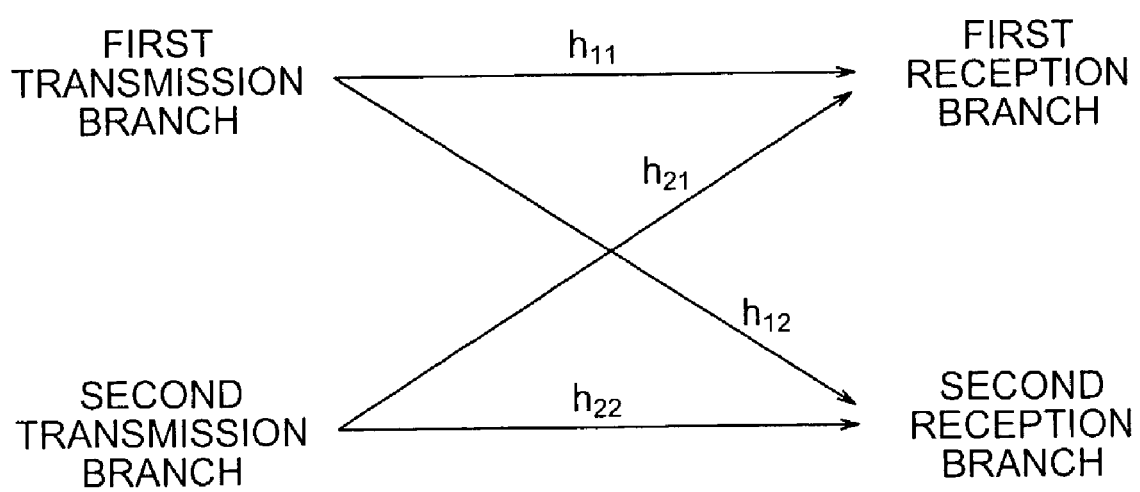
FIG. 11 is a schematic diagram of MIMO fading channels.

Referring to FIG. 11, description will be made of MIMO channels in a case where the number of array antenna groups of the transmission antennas is set to 2 and the number of reception antennas is set to 2. It is assumed that the channels between transmission and reception branches experience 2×2 independent fading. In this instance, a channel matrix H is expressed by:

$$H = \begin{pmatrix} h_1 & h_1 \\ h_2 & h_2 \end{pmatrix}.$$

The transmission signal of each array antenna group on the transmission side is expressed by $x=(x_1 x_2)^T$ (T denotes transposition). Then, the received signal $r=(r_1 r_2)^T$ at each antenna on the reception side is represented by:

$$r=Hx+v$$

where, v denotes thermal noise.

The MIMO demodulator 7 demodulates respective bits of data transmitted in parallel from the array antenna groups of the transmitter. MIMO demodulation methods are broadly divided into interference cancellation reception and maximum likelihood estimation reception. Herein, the maximum likelihood estimation reception having superior characteristics will now be described.

A demodulation bit in the MIMO maximum likelihood estimation reception is represented by $\hat{b}_i$. The likelihood function of the demodulation bit is expressed by $\Lambda(\hat{b}_i)$.

The likelihood function is expressed by:

$$\Lambda(\hat{b}_i)=\min_{x|b_i=0}\|r-H_x\|^2-\min_{x|b_i=1}\|r-H_x\|^2 \quad (2)$$

The MIMO maximum likelihood estimation reception is similar to maximum likelihood estimation reception of a multilevel modulation signal. Signals are transmitted from different antennas and are then multiplexed on propagation paths. The resultant signal is regarded as a multilevel modulation signal of a certain kind on the reception side. On the reception side, the likelihood of bits of each piece of data transmitted in parallel is calculated. The likelihood calculation sums the likelihoods of the respective reception antennas, thus determining the sum. Consequently, the effects of spatial diversity and the effects of cancellation of interference by other antennas are obtained.

Figure 12:
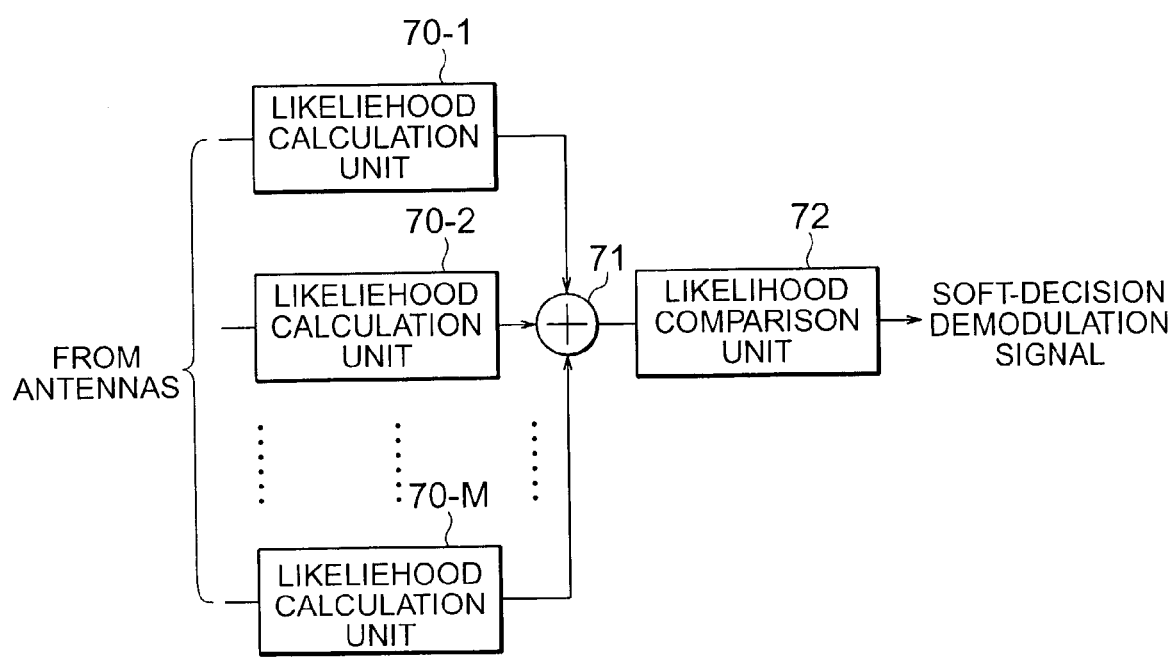
FIG. 12 is a block diagram showing an example of the structure of an MIMO demodulator 7 according to the first embodiment, the MIMO demodulator using maximum likelihood estimation means.

Referring to FIG. 12, description will be made of an example of the schematic structure of maximum likelihood estimation means serving as the MIMO demodulator 7 according to the present embodiment. Signals received by the reception antennas 6-1 to 6-M are subjected to likelihood calculation of bits of transmission data through likelihood calculation units 70-1 to 70-M, respectively. A combiner 71 adds the likelihoods of bits of the transmission data. A likelihood comparison unit 72 selects the minimum value and uses the value as a soft-decision modulation signal. In the MIMO demodulation operation, the likelihood calculation in Expression (2) is performed. The MIMO demodulation operation can be realized by software executing an MIMO demodulation function.

The present embodiment has been described for a case where the number of array antenna groups (M) on the transmission side is the same as the number of antennas (M) on the reception side. It is, however, not necessary for the number of array antenna groups on the transmission side and the number of antennas on the reception side to be equal. Generally, as the number of antennas on the reception side increases, the effects of spatial diversity and the effects of cancellation of interference by other antennas become larger.

The decoder 8 performs error correction decoding with soft-decision demodulation signals of respective bits. As for error correction methods, convolutional coding/Viterbi decoding and turbo coding/decoding are often used. According to the present embodiment, the transmitter has the encoder 1 while the receiver has the decoder 8 to thereby perform error correction control with soft-decision demodulation signals. However, these components are not essential to the present invention. The present invention also includes structures not performing error correction control.

Figure 13:
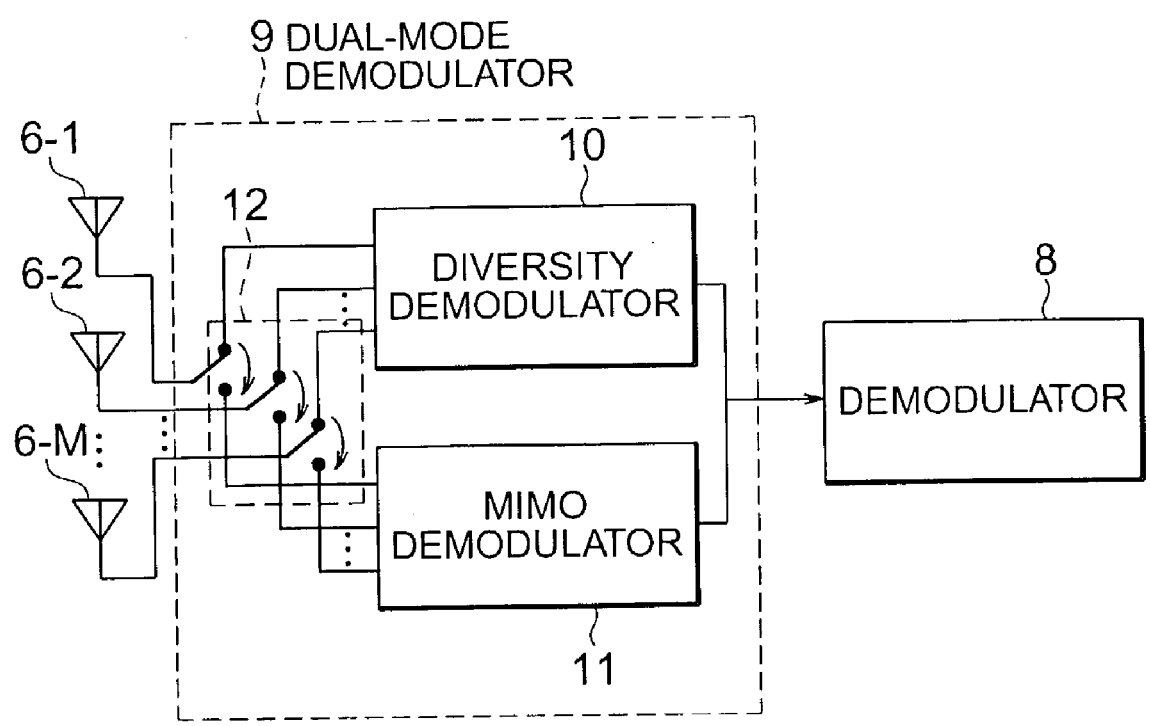
FIG. 13 is a block diagram of an antenna transmission and reception system according to a second embodiment of the present invention.

Referring to FIG. 13, the structure of a receiver according to a second embodiment of the present invention will be described below.

In addition, a cell system to which the second embodiment of the present invention is applied will be described with reference to FIG. 14

Figure 14:
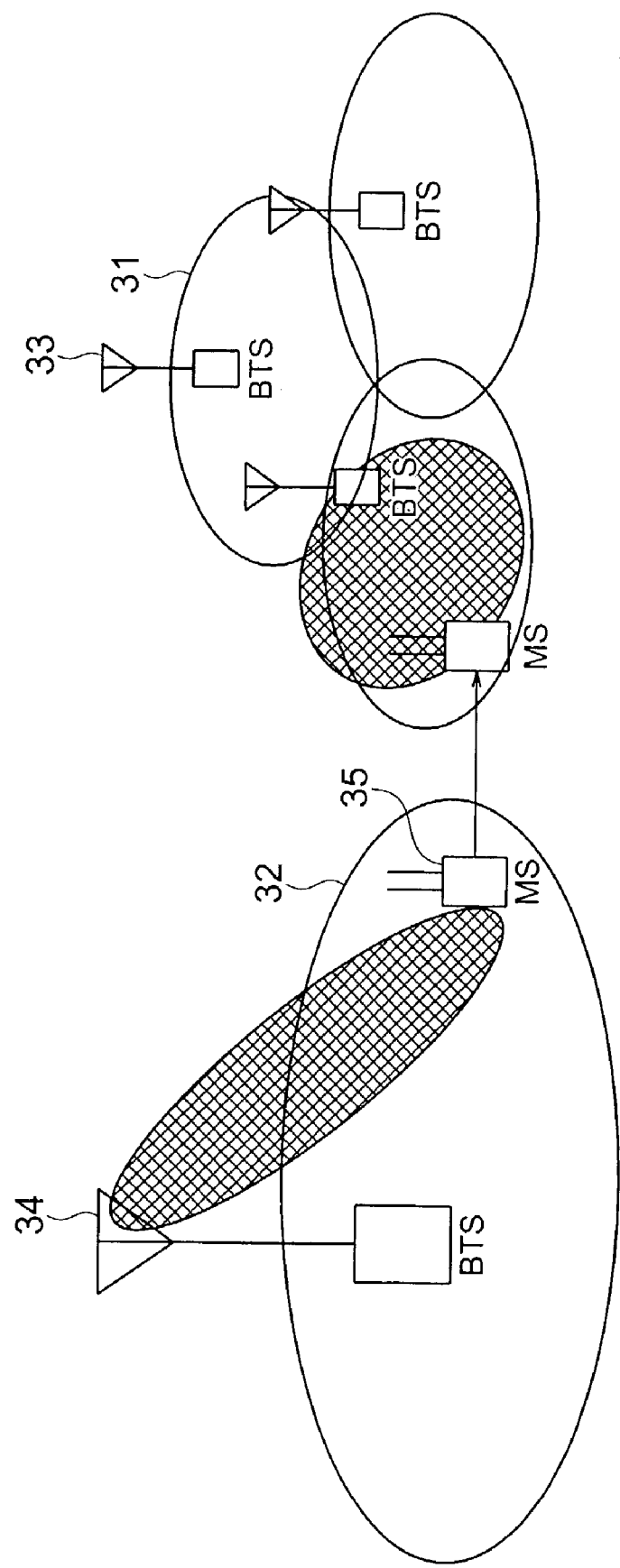
FIG. 14 is a diagram showing an example of a cell system in which a large cell system and small-to-medium-sized cell systems are mixed, the second embodiment of the present invention being applied to the cell system.

According to the present embodiment, as shown in FIG. 14, each small-to-medium-sized cell system 31 has a low-antenna base station 33. In the cell system 31, a plurality of transmission antennas of the base station 33 are divided into a plurality of array antenna groups. Each array antenna group performs loose directional-beam control. The respective array antenna groups transmit different data in parallel. Accordingly, both directional-beam transmission and MIMO transmission are performed. When a mobile station 35 is located in the small-to-medium-sized cell system 31, the mobile station 35 performs MIMO demodulation.

A large cell system 32 has a high-antenna base station 34. In the large cell system 32, since a usual diversity system is superior to other systems, only directional-beam transmission is performed. When the mobile station 35 is located in the large cell system 32, the mobile station 35 has to perform diversity reception.

When the respective systems are arranged, the base stations can select between directional-beam transmission and MIMO transmission in accordance with the corresponding cell propagation environment. The mobile station connects to both of the base station systems and communicate therewith. It is uneconomical for the mobile station to carry a plurality of terminals corresponding to each of the respective antenna transmission systems of the base stations. According to the present embodiment, therefore, a receiver has software to realize the diversity demodulation function and software to realize the MIMO demodulation function. The receiver includes a dual-mode demodulator to select the appropriate software in accordance with the base-station antenna transmission system, thus realizing diversity demodulation or MIMO demodulation.

According to the present embodiment, therefore, the receiver comprises the reception antennas 6-1 to 6-M, a dual-mode modulator 9, the decoder 8, and a demodulation-mode switching unit 12.

The reception antennas 6-1 to 6-M receive directional-beam transmission signals or MIMO transmission signals. In the dual-mode demodulator 9, the demodulation-mode switching unit 12 switches between the software in accordance with the base-station antenna transmission system so that the function of a diversity demodulator 10 is realized upon directional-beam transmission or the function of an MIMO demodulator 11 is realized upon MIMO transmission. Thus, the selected function is accomplished. The decoder 8 performs error correction decoding using soft-decision demodulation signals of respective bits serving as an output of the diversity demodulator 10 or the MIMO demodulator 11.

While the present invention has thus far been disclosed in conjunction with several embodiments thereof, it will be readily possible for those skilled in the art to put the present invention into practice in various other manners.

What is claimed is:

1. An antenna transmission and reception system in a mobile communication system, comprising:
    a base station which has a plurality of antennas, the antennas being divided into a plurality of array antenna groups in accordance with a cell propagation environment, each array antenna group performing loose directional-beam control, the array antenna groups transmitting different data in parallel utilizing a multiple input multiple output (MIMO) technique; and
    a mobile station which has a plurality of antennas to receive the data transmitted in parallel.

2. The system according to claim 1, wherein:
    an interval between each of the antennas of each array antenna group of the base station is set to $\lambda/2$, where $\lambda$ denotes a carrier wavelength, in order to increase an antenna correlation value, and
    an interval between each of the array antenna groups is set to $10\lambda$ or larger in order to reduce the antenna correlation value.

3. The system according to claim 2, wherein:
    at least one of the number of array antenna groups and a width of each directional beam of each array antenna group is determined in accordance with a difference between arrival angles of multipaths in the base station or the antenna correlation value of each array antenna group.

4. The system according to claim 1, wherein:
    at least one of the number of array antenna groups and a width of each directional beam of each array antenna group is determined in accordance with a height of each antenna of the base station or a radius of a cell where the base station is arranged.

5. An antenna transmission and reception system in a mobile communication system, comprising:
    a first base station group which includes first base stations each having a plurality of antennas and which constitute an array antenna to perform desired directional-beam control;
    a second base station group which includes second base stations each having a plurality of antennas, the antennas being divided into a plurality of array antenna groups in accordance with a cell propagation environment, each array antenna group performing loose directional-beam control, the array antenna groups transmitting different data in parallel utilizing a multiple input multiple output (MIMO) technique; and
    a mobile station which has a plurality of antennas and which performs diversity reception upon communicating with the first base station group and which receives data transmitted in parallel upon communicating with the second base station group.

6. The system according to claim 5, wherein:
    an interval between each of the antennas of each first base station is set to $\lambda/2$, where $\lambda$ denotes a carrier wavelength, so as to increase an antenna correlation value,
    an interval between each of the antennas of each array antenna group of each second base station is set to $\lambda/2$ so as to increase the antenna correlation value, and
    an interval between each of the array antenna groups is set to $10\lambda$ or larger so as to reduce the antenna correlation value.

7. The system according to claim 6, wherein:
    at least one of selection between the first base station group and the second base station group, the number of array antenna groups in each second base station, and a width of each directional beam of each array antenna group is determined in accordance with a difference between arrival angles of multipaths in each base station or the antenna correlation value of each array antenna group.

8. The system according to claim 5, wherein:
    at least one of selection between the first base station group and the second base station group, the number of array antenna groups in each second base station, and a width of each directional beam of each array antenna group is determined in accordance with a height of each antenna of each base station or a radius of a cell where the base station is arranged.

9. The system according to claim 5, wherein:
    the mobile station includes software having a diversity reception function and software having an MIMO (Multiple Input Multiple Output) reception function and selects between the software in accordance with an antenna transmission system of the base station to accomplish diversity reception or reception of data transmitted in parallel.

10. An antenna transmission and reception system in a mobile communication system, comprising:
    at base station which has a transmitter,
    wherein the transmitter comprising:
    a data serial-to-parallel converter for converting transmission data into M sequences, where M is an integer of 2 or more,
    M modulators for modulating the M sequences of the transmission data subjected to a serial-to-parallel conversion,
    M beam formers for weighting respective modulation signals to form directional beams, and
    M transmission antenna groups for transmitting M modulation signals in parallel, each modulation signal having directional beams controlled by the beam former; and
    a mobile station having a receiver,
    wherein the receiver comprising;
    reception antennas for receiving data transmitted in parallel, and
    an MIMO (Multiple Input Multiple Output) demodulator for demodulating transmission data.

11. An antenna transmission and reception system in a mobile communication system, comprising:
    a first base station group which includes first base stations each having a first transmitter,
    wherein the first transmitter comprising;
    a modulator for modulating transmission data,
    a beam former for weighting a modulation signal, output from the modulator, to form directional beams, and
    transmission antennas for transmitting the modulation signal having directional beams controlled by the beam former;

a second base station group which includes second base stations each having a second transmitter,
wherein the second transmitter comprising;
a data serial-to-parallel converter for converting transmission data into M sequences, where M is an integer of 2 or more,
M modulators for modulating the M sequences of transmission data subjected to the serial-to-parallel conversion,
M beam formers for weighting respective modulation signals to form directional beams, and
M transmission antenna groups for transmitting M modulation signals in parallel, each modulation signal having the directional beams controlled by the beam former; and
a mobile station which has a receiver;
wherein the receiver compromising;
reception antennas for receiving transmission data,
a diversity demodulator for performing diversity demodulation to data transmitted from the first base station group, and
an MIMO (Multiple Input Multiple Output) demodulator for
demodulating data transmitted in parallel from the second base station group.

12. The system according to claim 11, wherein:
the receiver of the mobile station has software having a diversity demodulation function of performing diversity demodulation to the data transmitted from the first base station group and software having an MIMO demodulation function of demodulating the data transmitted in parallel from the second base station group, and further Includes a demodulation-mode switching unit for switching between the software in accordance with an antenna transmission system of the base station to realize diversity demodulation or MIMO (Multiple Input Multiple Output) demodulation.

13. A mobile station for a mobile communication system, the mobile station being movable in each cell of a cell system in which each base station has a plurality of antennas, the antennas are divided into a plurality of array antenna groups in accordance with a cell propagation environment, each array antenna group performs loose directional-beam control, and the array antenna groups transmit different data in parallel, the mobile station comprising:
a plurality of reception antennas for receiving signals transmitted in parallel from the base station; and
MIMO (Multiple Input Multiple Output) demodulation means for demodulating the transmitted signals.

14. A mobile station for a mobile communication system, the mobile station being movable in each cell of a cell system, the cell system comprising a first cell group in which each base station has plurality of antennas constituting an array antenna to perform desired directional-beam control, and a second cell group in which each base station has a plurality of antennas, the antennas are divided into a plurality of array antenna groups in accordance with a cell propagation environment, each array antenna group performs loose directional-beam control, and the array antenna groups transmit different data in parallel, the mobile station comprising:
a plurality of reception antennas for receiving data transmitted from the base station;
diversity demodulation means for performing diversity demodulation to data transmitted from the base station of the first cell group;
MIMO (Multiple Input Multiple Output) demodulation means for demodulating data transmitted in parallel from the base station of the second cell group; and
demodulation-mode switching means for switching between a diversity demodulation mode and an MIMO (Multiple Input Multiple Output) demodulation mode.

* * * * *